United States Patent [19]
Schneid et al.

[11] Patent Number: 5,730,376
[45] Date of Patent: Mar. 24, 1998

[54] APPARATUS FOR REGULATED DISPERSION TREATMENT OF HIGHLY CONSISTENT FIBROUS SUBSTANCES

[75] Inventors: Josef Schneid, Vogt; Hans Schnell, Mengen, both of Germany

[73] Assignee: Voith Sulzer Stoffaufbereitung GmbH, Ravensburg, Germany

[21] Appl. No.: 670,503

[22] Filed: Jun. 27, 1996

[30]    Foreign Application Priority Data

Jun. 29, 1995 [DE] Germany ............... 195 23 704.8

[51] Int. Cl.$^6$ ............................................. B02C 7/12
[52] U.S. Cl. ........................................ 241/245; 241/261.2
[58] Field of Search ........................... 241/261.2, 261.3, 241/261.1, 296, 297, 298, 245

[56]              References Cited

U.S. PATENT DOCUMENTS 2,778,282  1/1957  Sutherland .
4,166,584  9/1979  Asplund ................ 241/261.3

FOREIGN PATENT DOCUMENTS 26 39 786  3/1977  Germany .
30 47 013  4/1983  Germany .

*Primary Examiner*—Mark Rosenbaum
*Attorney, Agent, or Firm*—Taylor & Associates, P.C

[57]               ABSTRACT

The invention is directed to a processing apparatus which can be used, for example, to disperse highly consistent fibrous paper substances. The apparatus consists of at least two intermeshed processing tools (1, 2), which are movable with respect to one another and which are provided with teeth (3, 3', 3", 4, 4"). The fibrous substance that is being processed passes along a gap between the processing tools and finally leaves the apparatus through an expulsion mechanism (8) that allows the adjustment of the size of the exit opening through which the substance exits. The control of the size of the exit opening allows control over the degree of compression acting on the substance and the fill level of the apparatus, both of which in effect control the process intensity.

15 Claims, 3 Drawing Sheets

APPARATUS FOR REGULATED DISPERSION TREATMENT OF HIGHLY CONSISTENT FIBROUS SUBSTANCES

BACKGROUND OF THE INVENTION

1. Field of the Invention

The present invention relates to an apparatus for the regulated dispersion treatment of highly consistent fibrous substances.

2. Description of the Related Art

An apparatus for the regulated dispersion treatment of highly consistent fibrous substances is already known, for example, from DE-PS 30 47 013. Equipment such as this is used for dispersion treating old paper, and serves the purpose of mechanically and thermally treating a fibrous substance so that undesirable substances are removed from the fibers, ground up into small particles and/or transformed below a visible level. Other than grinding equipment for paper-like substances, the fibrous substances are not transformed into a suspension that can be pumped through pipes, but is processed into a soft, doughy consistency with a dry content of preferably 20 to 35%. This way allows to increase the shear strength of the final product, so that the ultimate objective is achieved without changing the length of the fibers. In many instances the mechanical effects are enhanced by applying heat, for example by maintaining a substance temperature of 90° C. or higher. Other sorts of equipment such as kneading machines, which require much longer processing or cure times, can also affect dispersion treatment.

The document DE-OS 26 39 786 describes a grinding apparatus that processes substances such as, for example, ground pork into fibers. This process is not comparable with a "high-consistency disperser", because the latter starts with the already fibrous substance.

Because of its high consistency during the procedure it is possible to mechanically process the fibrous substance without actual contact of grinding teeth. These teeth move relative to one another, at a distance of about 1 mm or more. The distance between the processing tools can often be varied in order to modify the processing intensity. Furthermore, it is a known fact that the processing intensity is affected by the consistency of the substance, so that the water content is varied to control the process. The consistency is controlled, for example, by regulating water levels before the fibrous substance enters the process chamber. This method works well but it has the disadvantage that the substance must be thickened in such a manner that this leads to a higher dry content than necessary, whereas one has to bear in mind that thickening is a rather expensive process. This thickening is necessary due to the fact that a sufficient regime for controlling must be provided. Furthermore the controlling effort therefore is quite considerable.

SUMMARY OF THE INVENTION

The present invention provides an improved control over the processing intensity of an apparatus for the regulated dispersion treatment of highly consistent fibrous substances.

The invention comprises, in one form thereof, an apparatus for regulating the dispersion of a highly consistent fibrous substance. At least two processing tools are provided with at least one processing tool being movable relative to the other processing tool. The processing tools are substantially rotationally symmetric and coaxial with respect to one another. Each processing tool has circular and concentrically positioned rows of teeth, with the teeth within each row of teeth being separated from each other by spaces large enough to allow the fibrous substance to flow therebetween. Adjacent rows of teeth on each processing tool define respective ring shaped openings therebetween. At least one row of teeth of one processing tool penetrates into a corresponding ring shaped opening of the other processing tool such that a distance between adjacent rows of teeth is greater than or substantially equal to 1 mm. At least one of the processing tools includes an expulsion mechanism which defines an exit opening for the fibrous substance to flow through and from the apparatus. A regulating mechanism adjusts the size of the exit openings of the expulsion mechanism through which the fibrous substance flows.

The procedure to control the processing intensity is based on varying the distance between the outlet cross section of the processing tools or of the adjoining degrees of admission and/or by varying the compression acting on the processing tools.

As mentioned above, processing intensity has been controlled in many cases by adjusting the distance of the processing tools relative to each other. A reduction in the distance will increase the processing intensity and vice versa. Controlling the distance between the teeth is generally realized by a chamfer on the grinding teeth. This chamfer will cause movement of the teeth orthogonally to their peripheral motion to result in a change of the distance between one another. Because of this chamfer the teeth do not have a constant cross section anymore. Teeth of non-constant cross section will, in effect, limit the axial extension of radially penetrated processing tools. By employing this invention in such cases it is possible to construct processing tools with much longer teeth, as seen in the axial direction.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
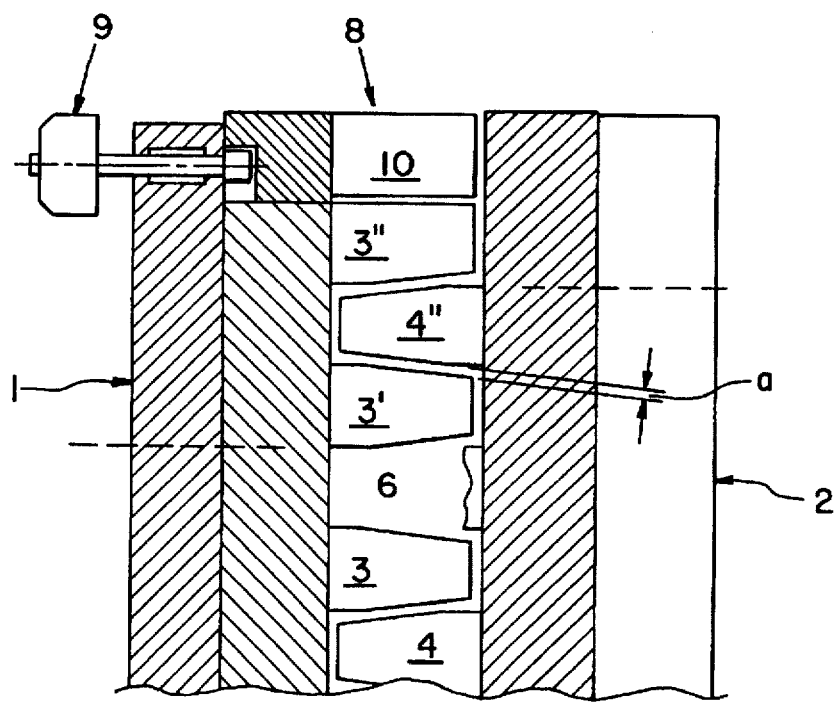
FIG. 1 is a side sectional view of an embodiment of the apparatus of the present invention.

Referring now to the drawings and particularly to FIG. 1, there are shown two complementary processing tools, 1 and 2, that are moveable towards and away from each other. Processing tools 1, 2 are intermeshed so that they can act onto one another. The side sectional view indicates that the grinding teeth, i.e., 3, 4, 3', 4", 3", belong in alternating fashion to one or the other process tool 1, 2 (left, right, etc.). For illustration purposes one of the teeth of processing tool 2 is omitted, leaving a void. The arrangement is so that each row (or ring) of teeth will extend into the opening between the teeth of the opposite row (or ring). Between adjacent rows of teeth of opposing processing tools remains only a small distance "a"

Figure 2:
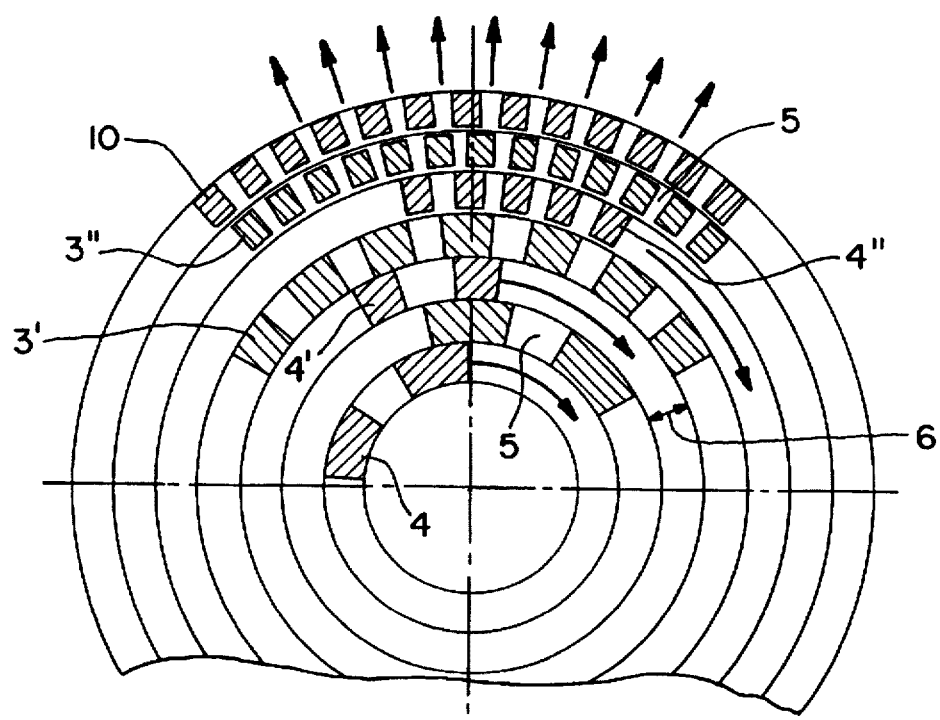
FIG. 2 is a top view of the apparatus shown in FIG. 1.

The top view of processing tool 1, FIG. 2, shows that the openings between adjacent rows of teeth are ring shaped. Also the teeth 3, 3', 3", 4, 4', 4", are arranged in radial fashion. The concept of such a processing tool is already known and used, for example, for "Entstippen" (removal of some sort of protrusions) or for dispersing. A fundamental innovation is the expulsion mechanism 8. The illustration shows to this effect a radial arrangement of teeth with a large number of teeth 10. The practical aspect to this is that the radially outward row or last row (or ring) of teeth, looking "downstream", belongs to the same processing tool as the neighboring adjacent row or second most radially outward row (or ring) with teeth 3". Consequently there is no alternation of teeth like with the other intermeshed rows (or rings). The rows (or rings) of teeth can be offset relative to one another, as shown in FIG. 2. The vacant spaces 5 of the second to the last row of teeth can therefore be covered up more or less with teeth 10. This causes a damping effect that is easily controlled. The regulating mechanism 9 illustrated in FIG. 1 is used to adjust teeth 10. The passage of fibrous substances through the processing apparatus is indicated by many small arrows in FIG. 2. Only very few teeth are shown in order to simplify the schematic and clarify the illustration. The teeth are generally evenly distributed along the circumference.

It is well known that there is a great number of differently arranged grinding teeth in use. The arrangement is dependent on the purpose that it is intended for and on the ease with which such a tool can be produced.

Figure 3:
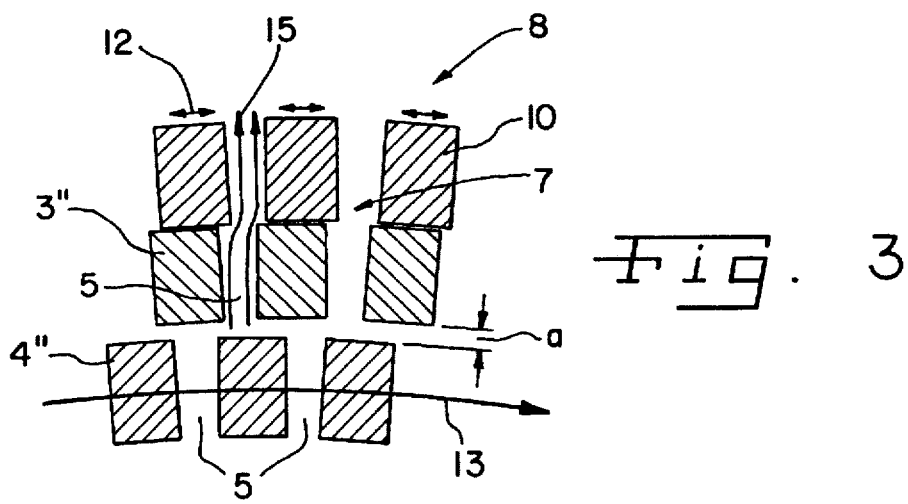
FIG. 3 is a schematic illustration of an effect of the apparatus of the present invention during use.

FIG. 3 illustrates the already mentioned effect of the expulsion mechanism 8 in a slightly different way. The teeth 10 belong to the last row in the downstream direction and include inner faces and the teeth 3" belong to the second to the last row of processing tool 1 and include outer faces. The inner faces of teeth 10 partially and selectively overlap the outer faces of teeth 3". When the teeth 3" are held steady in one location while the teeth 10 are rotated by a small angle, then the stream of the processed fibrous substance, indicated by arrows 15 will pass through a different section 7 at the transition from the space 5 between teeth 3" to the space between teeth 10. This causes the regulation of the passage of fibrous substance between the teeth. Further upstream from teeth 3", the teeth 4" of the opposing processing tool 2 rotate at high speed (indicated by arrow 13). This produces the high amount of fluid shearing between the teeth 3" and 4" and the passing fibrous substance.

Figure 4:
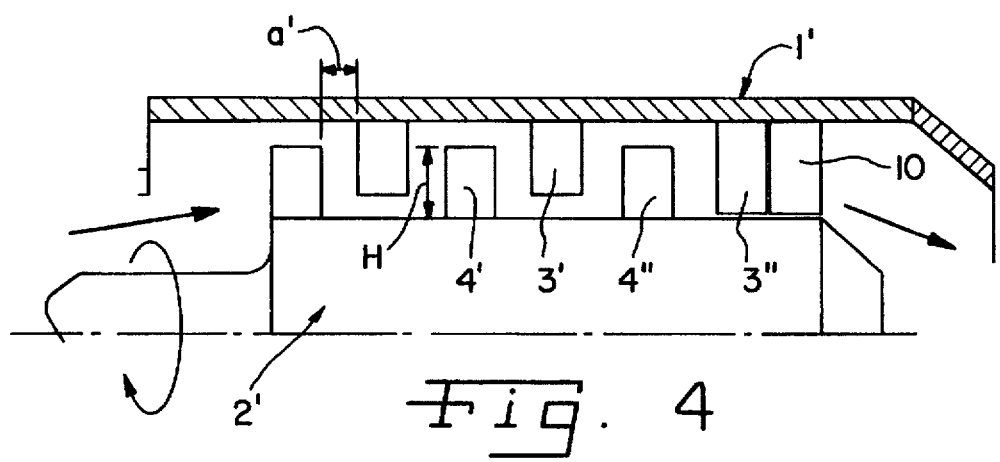
FIG. 4 is a schematic illustration of another embodiment of the present invention.
Figure 5:
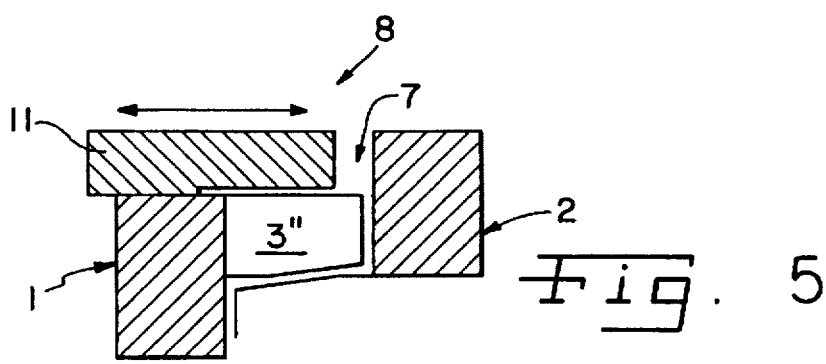
FIG. 5 is a side sectional view of another embodiment of the present invention.
Figure 6:
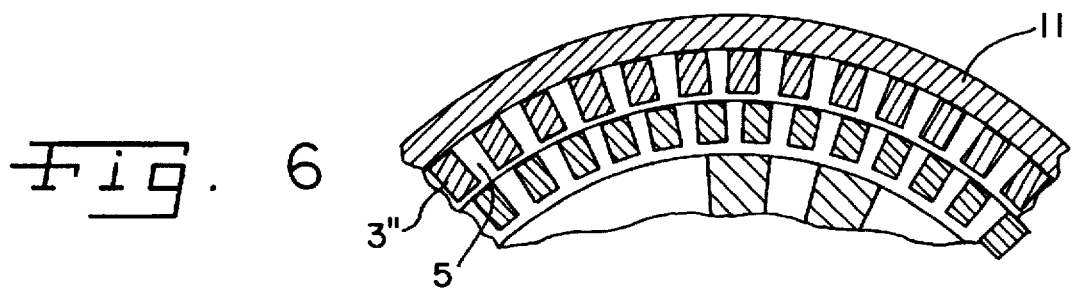
FIG. 6 is a top view of the embodiment shown in FIG. 5.

FIG. 4 illustrates that an implement constructed according to the present invention applies not only for an axial stream of fibrous substance but also for radial movement. FIG. 4 shows processing tools 1', 2' as part of a stator and rotor, respectively. The teeth have a height H. The distance between the teeth is moveable towards one another as denoted by a'. Similarly, teeth 10 and teeth 3" can be moveable relative to each other in a radial direction. Stator 1' and rotor 2' each include an opposing inner annular surface. Each tooth, including teeth 10, are attached to and project from one of these opposing inner annular surfaces FIGS. 5 and 6 show yet another way to regulate the expulsion mechanism 8. This embodiment shows a ring 11 which can be shifted orthogonally to the flow direction and to the second to the last row of teeth. This is yet another way to vary the cross sectional area and thus control the flow of the exiting stream of substance. FIG. 5 shows a side sectional view while FIG. 6 displays a top view of the embodiment.

Figure 9:
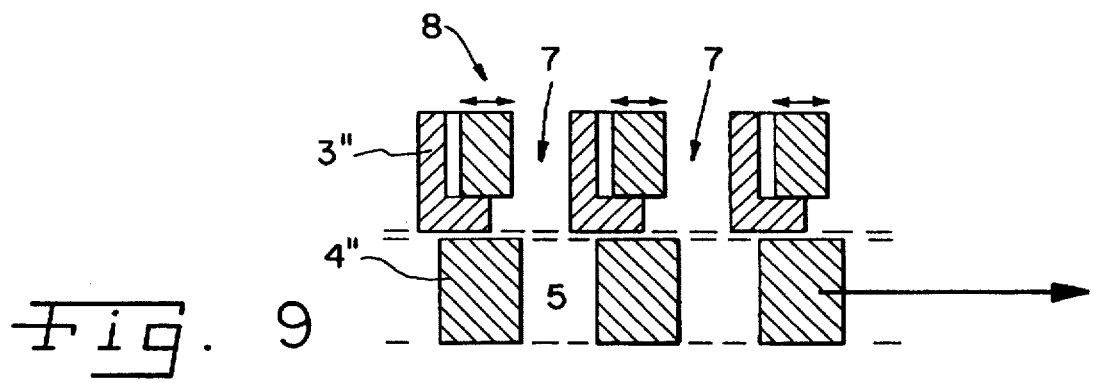
FIG. 9 is a top view of another embodiment of the present invention.

Further variations of this concept to adjust the cross-sectional area of the stream are conceivable. As an example, FIG. 9 shows how the teeth of the last row of teeth can be made of several components so that they are collapsible and/or expandable. As teeth expand, the gap between them decreases and vice versa.

Figure 7:
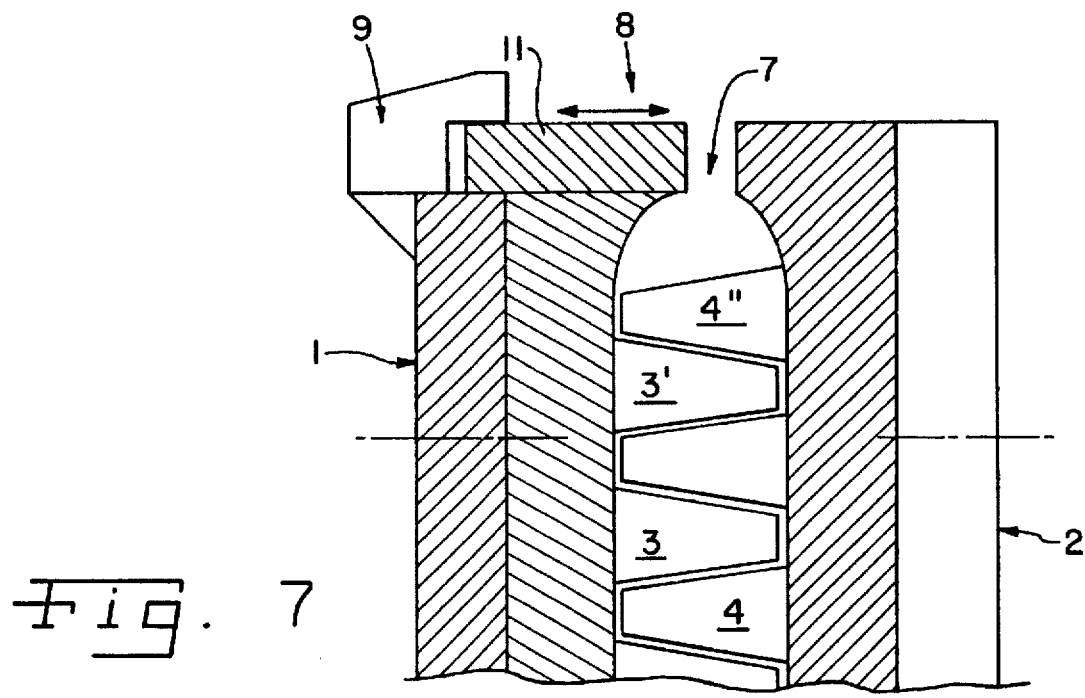
FIGS. 7 and 8 are side views of two further embodiments of the present invention.

In general it is simpler and more constructive to apply the above described adjustable implementation in the stator section, 1 and 1', of the processing apparatus. This solution is especially easier to implement when the row (or ring) of teeth that is furthest downstream of the substance flow belongs to the stator. But other solutions are possible, such as shown in FIG. 7. This embodiment includes a rotor, part of which constitutes the last row of teeth, i.e., teeth 4". The purpose of this version is that the processed fibrous substance shall be, in certain instances, expulsed by the last row (or ring) of teeth. As shown, the invention can be applied to such procedure if desired. In this instance the processing tool is equipped with an adjustable spacer ring 11, oriented perpendicular to the flow direction.

Figure 8:
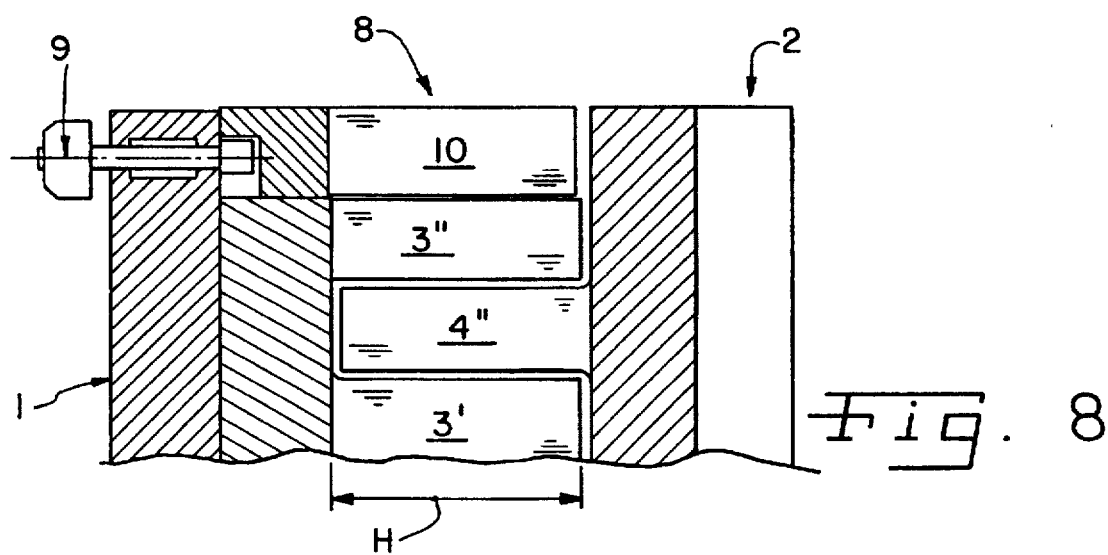

As mentioned above, the present invention can replace intermeshing processing tools (such as rotor and stator) that must be spatially adjusted with respect to one another in order to control the flow output and the applied load. For this purpose, the teeth can have a mostly constant cross section, which is especially advantageous when a rather large height, H, of the teeth is desired (See FIG. 8).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for regulating the dispersion of a highly consistent fibrous substance, comprising:

at least two processing tools with at least one said processing tool being movable relative to the other said processing tool, said processing tools being substantially rotationally symmetric and coaxial with respect to one another, each said processing tool having an inner annular surface with circular and concentrically positioned rows of teeth attached to and projecting therefrom, said inner annular surface of each said processing tool facing toward said inner annular surface of another said processing tool, said teeth within each said row of teeth being separated from each other by spaces large enough to allow the fibrous substance to flow therebetween, adjacent said rows of teeth on each said processing tool defining respective ring shaped openings therebetween, at least one said row of teeth of one said processing tool penetrating into a corresponding said ring shaped opening of the other said processing tool such that a distance between adjacent said rows of teeth is greater than or substantially equal to 1 mm;

at least one of said processing tools including an expulsion mechanism consisting of at least some of said teeth, said expulsion mechanism defining an exit opening for the fibrous substance to flow through and from said apparatus; and a regulating mechanism for adjusting a size of said exit opening of said expulsion mechanism through which the fibrous substance flows.

2. The apparatus according to claim 1, wherein said regulating mechanism is rotationally symmetric and coaxial to said processing tools.

3. The apparatus according to claim 1, wherein one of said processing tools comprises a rigid stator, and another of said processing tools comprises a movable rotor.

4. The apparatus according to claim 3, wherein said stator includes said expulsion mechanism.

5. The apparatus according to claim 1, wherein said rows of teeth on one of said processing tools includes a radially outward row of teeth, and wherein said expulsion mechanism comprises said radially outward row of teeth and a ring disposed on the radially outward side and adjacent to said radially outward row of teeth, said ring being movable relative to said radially outward row of teeth such that said spaces between said teeth of radially outward row of teeth are partially and selectively blocked.

6. The apparatus according to claim 5, wherein said one processing tool includes said radially outward row of teeth and the other said processing tool carries said ring, said radially outward row of teeth having respective outer faces and said ring having an inner face, said inner face of said ring at least partially overlapping said outer faces of said radially outward row of teeth.

7. The apparatus according to claim 1, wherein each said processing tool comprises a planar disc which carries said respective rows of teeth.

8. The apparatus according to claim 1, wherein said rows of teeth on one of said processing tools includes a radially outward row of teeth having inner faces and an adjacent second most radially outward row of teeth having outer faces, said inner faces of said radially outward row of teeth partially and selectively overlapping said outer faces of said second most radially outward row of teeth so as to partially and selectively block said spaces between said teeth in said second most radially outward row of teeth.

9. The apparatus according to claim 1, wherein adjacent said rows of teeth of said processing tools are positioned parallel and spaced apart from each other.

10. The apparatus according to claim 1, wherein at least one said row of teeth of one said processing tool is movable in a radial direction with respect to an adjacent said row of teeth of the other said processing tool.

11. The apparatus according to claim 1, wherein at least one said tooth of at least one said row of teeth is at least one of collapsible and expandable.

12. The apparatus according to claim 11, wherein said at least one tooth includes at least two components.

13. An apparatus for regulating the dispersion of a highly consistent fibrous substance, comprising:

at least two processing tools with at least one said processing tool being movable relative to the other said processing tool, said processing tools being substantially rotationally symmetric and coaxial with respect to one another, each said processing tool having circular and concentrically positioned rows of teeth, said teeth within each said row of teeth being separated from each other by spaces large enough to allow the fibrous substance to flow therebetween, adjacent said rows of teeth on each said processing tool defining respective ring shaped openings therebetween, at least one said row of teeth of one said processing tool penetrating into a corresponding said ring shaped opening of the other said processing tool such that a distance between adjacent said rows of teeth is greater than or substantially equal to 1 mm;

at least one of said processing tools including an expulsion mechanism defining an exit opening for the fibrous substance to flow through and from said apparatus, said expulsion mechanism comprising at least some of said rows of teeth, said rows of teeth on one of said processing tools including a radially outward row of teeth and an adjacent second most radially outward row of teeth, said radially outward row of teeth and said second most radially outward row of teeth being movable in a rotating manner relative to each other such that said spaces between said teeth in said second most radially outward row of teeth are partially and selectively blocked by an associated said tooth of said radially outward row of teeth; and a regulating mechanism for adjusting a size of said exit opening of said expulsion mechanism through which the fibrous substance flows.

14. The apparatus according to claim 13, wherein said radially outward row of teeth and said second most radially outward row of teeth have the same number of teeth.

15. An apparatus for regulating the dispersion of a highly consistent fibrous substance, comprising:

at least two processing tools with at least one said processing tool being movable relative to the other said processing tool, said processing tools being substantially rotationally symmetric and coaxial with respect to one another, each said processing tool having circular and concentrically positioned rows of teeth, said teeth within each said row of teeth being separated from each other by spaces large enough to allow the fibrous substance to flow therebetween, adjacent said rows of teeth on each said processing tool defining respective ring shaped openings therebetween, at least one said row of teeth of one said processing tool penetrating into a corresponding said ring shaped opening of the other said processing tool such that a distance between adjacent said rows of teeth is greater than or substantially equal to 1 mm;

at least one of said processing tools including an expulsion mechanism defining an exit opening for the fibrous substance to flow through and from said apparatus, said expulsion mechanism comprising at least some of said rows of teeth, said rows of teeth on one of said processing tools including a radially outward row of teeth having inner faces and an adjacent second most radially outward row of teeth having outer faces, said inner faces of said radially outward row of teeth partially and selectively overlapping said outer faces of said second most radially outward row of teeth so as to partially and selectively block said spaces between said teeth in said second most radially outward row of teeth, at least one of said radially outward row of teeth and said second most radially outward row of teeth being movable in a radial direction relative to each other; and a regulating mechanism for adjusting a size of said exit opening of said expulsion mechanism through which the fibrous substance flows.

* * * * *